INVENTORS
HAROLD H. KOPPEL
JOHN R. LOUIS
BY
*John F. Luhrs*
ATTORNEY

INVENTORS
HAROLD H. KOPPEL
JOHN R. LOUIS
BY
*John F. Luhrs*
ATTORNEY

INVENTORS
HAROLD H. KOPPEL
JOHN R. LOUIS
BY
John F. Luhrs
ATTORNEY

United States Patent Office 3,105,182
Patented Sept. 24, 1963

3,105,182
CONTROL APPARATUS
Harold H. Koppel, South Euclid, and John R. Louis, Euclid, Ohio, assignors to Bailey Meter Company, a corporation of Delaware
Filed Apr. 13, 1959, Ser. No. 805,820
14 Claims. (Cl. 318—446)

This invention relates to control apparatus and more particularly to circuitry for indicating the failure of an electrical component.

In modern instrumentation systems such as those employed in modern power plants, there is an increasing trend toward the use of electrical control appartus. One limitation on the use of such equipment, however, is the increased possibility of component failure as compared with the pneumatic and hydraulic systems.

The efficiency demanded of modern power plants requires the control of a plurality of control elements from a plurality of variables such as illustrated and described in copending application Serial No. 805,019, filed on April 8, 1959, by Anthony J. Hornfeck et al. In such systems many components such as electrical control relays and amplifiers are employed which are subject to becoming inoperative as a result of failure of one or more circuit components.

One of the most common points of failure in an electrical control system is the vacuum tube employed in the amplifier of a control relay such as described in the aforementioned Hornfeck et al. application and disclosed and claimed in detail in copending application Serial No. 770,710, filed on October 30, 1958, by Harold H. Koppel et al., which issued March 5, 1963, as Patent No. 3,080,-531. In the tube itself the filament or cathode heater is probably the weakest element and the major cause of tube failure. Filament burn-out, shorts, and discontinuity are conditions frequently encountered and are sufficient to render an entire circuit such as employed in a control relay inoperative.

When a control relay in a complex system becomes inoperative by reason of filament failure or some other condition it is desirable to terminate automatic control from the particular control relay affected or to lock any associated control elements in a predetermined position. In the past such protective measures have been difficult in that one control relay may directly affect the position of a plurality of control elements in parallel while one or more of the same control elements may also be influenced by any number of additional control relays. Thus, the problem is one of selectively modifying or terminating control of desired control elements in response to failure of a control relay without unnecessarily terminating or modifying control of those not directly affected by the failure.

It is a principal object of this invention to manifest the occurrence of any one of a plurality of conditions by means of a single circuit.

Another object of the invention is to terminate or modify control of a control element in response to failure of any one of a plurality of control relays utilized in control of said control element.

Another object of the invention is to logically modify operation of selected control elements in a group of control elements in response to failure of an electrical component affecting said selected components.

Other objects and advantages will become apparent from the following description taken in connection with the accompanying drawings wherein.

Figure 1:
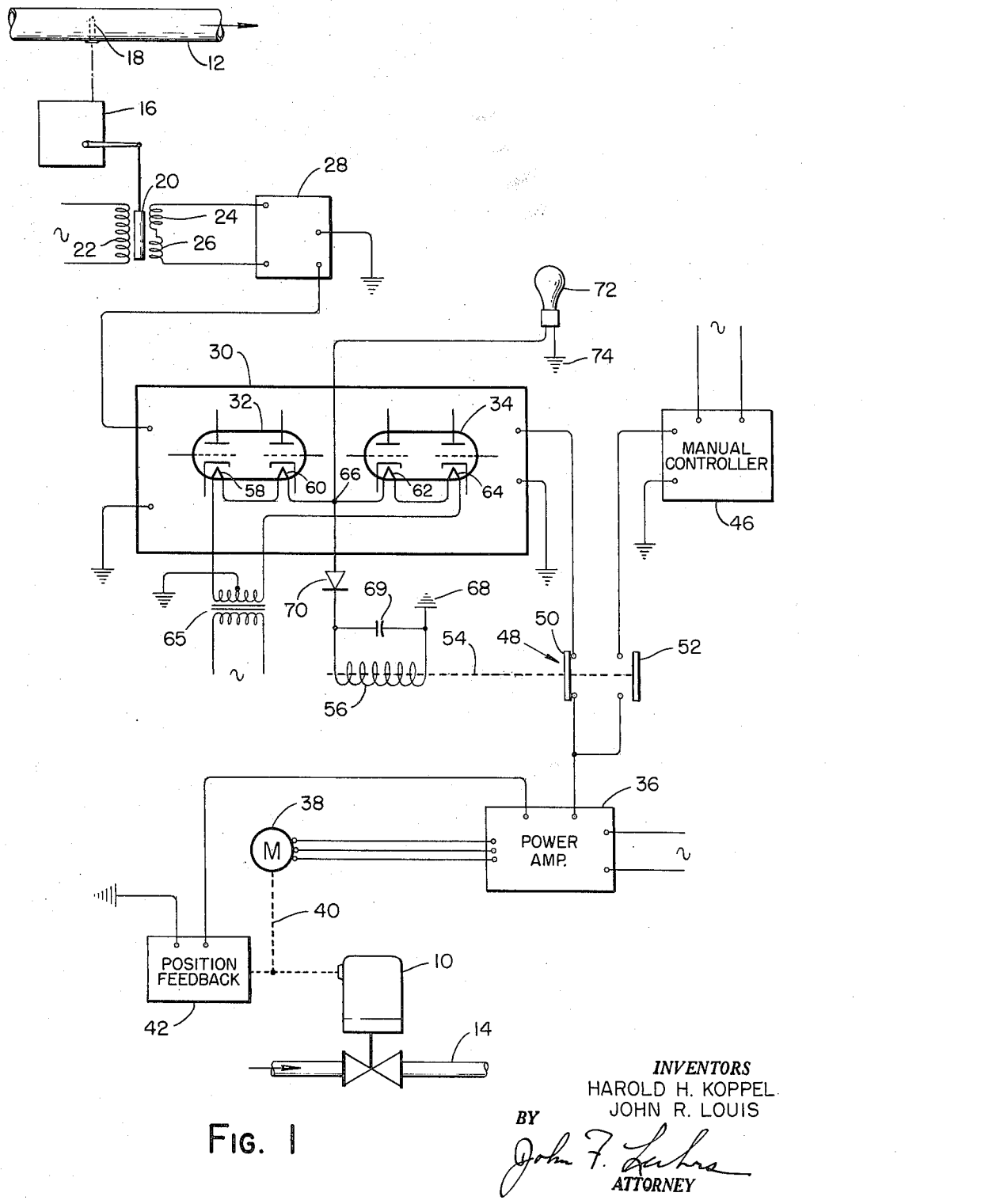
FIG. 1 is a diagrammatic illustration of a control apparatus embodying this invention.

Referring more particularly to FIG. 1 of the drawings, there is shown a single-element control system comprising a final control element or valve 10 which is actuated in accordance with the temperature of a fluid in conduit 12 to control the flow rate of fluid in conduit 14. A transmitting device 16 is responsive to the temperature of the fluid in conduit 12 as sensed by a sensing element 18 to actuate the movable core 20 of a movable core transformer having a primary winding 22 and a pair of serially connected, oppositely wound secondary windings 24 and 26. The primary winding 22 is connected across a suitable source of alternating voltage as indicated schematically while the secondary windings 24 and 26 are coupled to a demodulator 28. With this arrangement a modulated signal is supplied to the input of the demodulator 28 with a carrier frequency corresponding to the frequency of the A.-C. source, the modulated amplitude of this signal being proportional to the temperature of the fluid in conduit 12. Transmitting devices of this nature are well known to those skilled in the art and, therefore, further description is deemed unnecessary.

The demodulator 28 is effective to remove the A.-C. carrier signal to establish a variable D.-C. signal at its output terminals proportional to the temperature of the fluid in conduit 12. The transmitting device 16 and demodulator 28 may be calibrated to produce any desired range and level of direct voltage at the output terminals of demodulator 28 in the range of temperature variation encountered. As disclosed in Hornfeck et al. application Serial No. 805,019, this direct voltage signal may be caused to vary in the range of −25 to +25 volts.

The output of the demodulator 28 is impressed on the input terminals of a control relay or controller 30 which may be composed of one or more plug-in control action units of the type disclosed in Hornfeck et al. application Serial No. 805,019. As disclosed in this copending application, the control relay 30 may employ one or more D.-C. amplifier circuits of the type disclosed and claimed in copending application Serial No. 770,710, filed October 30, 1958, now Patent No. 3,080,531. For purposes of illustrating the operation of the invention, however, the vacuum tubes employed in this amplifier circuit are illustrated schematically by the reference numerals 32 and 34. For a complete disclosure and understanding of such an amplifier circuit reference is made to the aforementioned copending application.

The output of the control relay 30 is applied during normal operation of the system to a power amplifier 36 the output of which is utilized to operate an electric motor 38 which in turn through linkage 40 positions the valve 10. A position feedback transmitter 42 is effective to establish a voltage signal representative of the position of the valve 10 which is compared with the output of control relay 30 in the power amplifier 36 to establish the input thereto. For a complete disclosure of the structure of the positioning system comprising amplifier 36, motor 38 and feedback transmitter 42, reference is made to copending application Serial No. 786,820, filed on January 14, 1959, by Anthony J. Hornfeck et al., which issued January 2, 1962, as Patent No. 3,015,768.

A manual controller 46 is effective to establish a manually adjustable direct current voltage for controlling the position of the valve 10 independently of the control relay 30. As will later be described provision is made for transferring control from the control relay 30 to the manual controller 46 in response to failure of any one of the filaments of the tubes 32 and 34. To accomplish this transfer switch means 48 are provided for selectively connecting the appropriate unit to the power amplifier 36.

The switch means 48 includes a pair of movable contacts 50 and 52 which are effective to connect the outputs of control relay 30 and manual controller 46 respectively to the power amplifier. The movable contacts 50 and 52 are connected by linkage 54 to be actuated as a unit by a relay coil 56. In the deenergized condition of relay coil 56 shown, the contact 50 is closed to connect the control relay 30 to the power amplifier 36 and the contact 52 is open disconnecting the controller 46. Energization of the relay coil 56, however, will effect opening of contact 50 and closure of contact 52 to disconnect the control relay 30 and transfer control to the manual controller 46.

If it should be desired a manual reset device (not shown) may be associated with the switch means 48 to prevent automatic actuation or instantaneous return of the contacts 50 and 52 to the positions illustrated in FIG. 1 when the relay coil 56 becomes deenergized after a period of energization. Inasmuch as such manual reset devices are well known to those skilled in the art a detailed description and disclosure thereof is deemed unnecessary.

Referring now to the control of relay coil 56, this component is adapted to be energized in response to failure of any one of the filaments in vacuum tubes 32 and 34 to effect actuation of switch means 48 and transfer of control of valve 10 from the control relay 30 to manual controller 46. As shown schematically each of the tubes 32 and 34 comprises two separate triode sections each having an anode, a cathode and a grid. The four separate triode sections are provided with filaments or heaters 58, 60, 62 and 64 respectively which are connected in series with the secondary winding of a transformer 65. The primary winding of the transformer 65 is connected across a suitable alternating voltage source sufficient to produce the required voltage drop across each of the filaments. As will be apparent to those skilled in the art, the source voltage may be varied to accommodate tubes of various sizes and characteristics.

The filament circuit described above is provided with a terminal 66 intermediate the filaments 60 and 62 to establish a point of zero potential with reference to the grounded center tap of the secondary of transformer 65 when all of the filaments are operative. During normal operation the voltage drops across the filaments 58 and 60 will equal the voltage drops across the filaments 62 and 64 to thus produce a balanced circuit wherein the potential at terminal 66 with reference to the grounded center tap of the secondary of transformer 65 is zero. If, however, one of the filaments should burn or short out the voltage drops across the filaments will no longer be equal and an unbalanced condition will be established producing an alternating potential at terminal 66. Accordingly, if any one of the four filaments illustrated should fail the potential at terminal 66 will vary from zero to some fixed value.

The relay coil 56 is connected in series with the terminal 66 and ground at 68 to be energized in response to the existence of a potential at terminal 66. With this arrangement the existence of a potential at terminal 66 representative of the failure of one of the serially connected filaments will energize the relay coil 56 and effect actuation of the switch means 48 to transfer control from the control relay 30 to the manual controller 46. The rectifier 70 will conduct only during alternate half cycles of the potential existing at terminal 66 to thereby apply a half wave rectified D.-C. signal to the relay coil 56. A capacitor 69 connected in parallel with the relay coil 56 serves to smooth the half wave rectified signal established by diode 70.

The use of the rectifier 70 has a number of advantages. One advantage is the fact that the relay coil 56 is insensitive to the phase of the potential produced at terminal 66 which may depend on which particular filament fails. Still another advantage is the fact that the D.-C. signal established permits the use of a D.-C. relay coil much cheaper in cost than A.-C. relay coils. As will later be described the rectifier 70 is also employed to permit selective energization of desired relay coils in a complex system.

To provide for visual indication of a filament failure an incandescent lamp may be connected in series with the terminal 66 and ground at 74. The lamp 72 is energized upon the existence of a potential at terminal 66 simultaneously with the relay coil 56 to inform the operator that the system has been transferred from automatic to manual control and that servicing of the control relay 30 is required. The lamp 72 may be mounted on a control panel or other location where such indication is desired.

The system disclosed in FIG. 1 thus provides for a positive transfer of control from the relay 30 to the manual controller 46 in response to failure of any one of the tubes in the control relay 30. This result is accomplished through the use of a single relay coil which is responsive to the failure of any one of a plurality of filaments. While we have shown only four filaments in the circuit illustrated in FIG. 1, it will be apparent to those skilled in the art that the number is in no manner limited and that the invention is applicable to complex circuits employing many vacuum tubes. Furthermore, the concept which we have utilized is not limited to detecting the failure of a vacuum tube but may be employed to detect the failure of any electrical component in a group of components connected in a balanced circuit.

Figure 2:
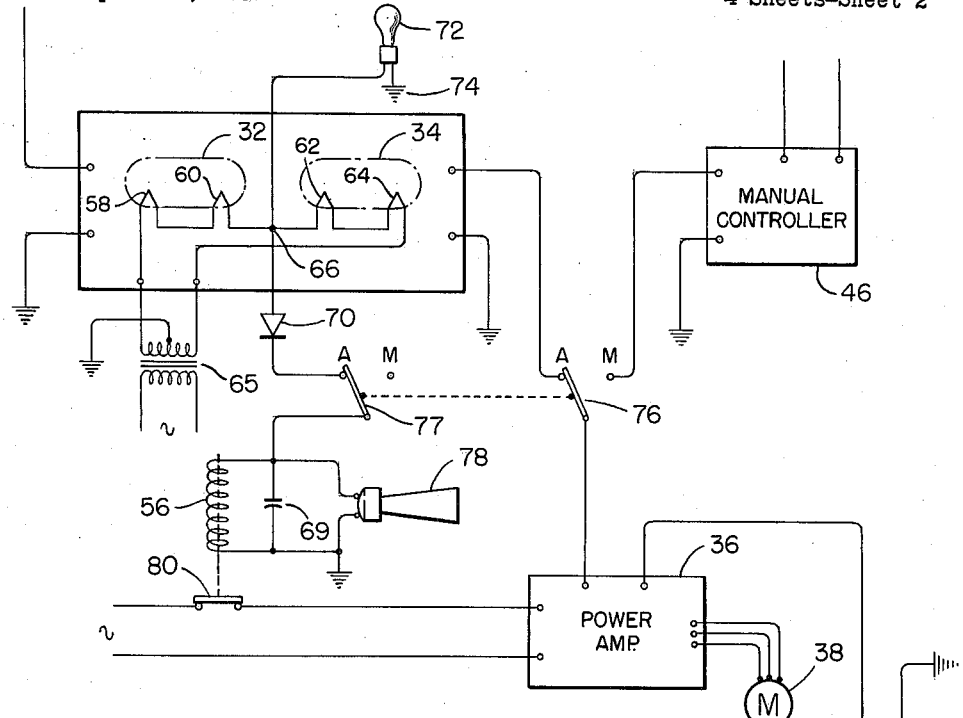
FIG. 2 is a view similar to FIG. 1 illustrating a modification of the apparatus.

Referring now to the embodiment disclosed in FIG. 2 of the drawings wherein similar parts are given like reference numerals, a manually actuated transfer switch 76 is provided for transferring control from the control relay 30 to the manual controller 46. The switch 76 in general comprises a single pole, double throw switch having one position for connecting the output of control relay 30 to the power amplifier 36 and a second position for connecting the manual controller 46 to the power amplifier 36. The reference letters A and M designate the "automatic" and "manual" positions respectively of the switch 76.

A second switch 77 is connected in series with the diode 70 and mechanically connected to the movable contact of switch 76 to be actuated simultaneously therewith. In the "automatic" position of switch 76, the switch 77 is closed to complete the circuit from terminal 66 to relay coil 56, while in the "manual" position, the switch 77 is open to insure deenergization of the relay coil 56 during manual operation as will later be described.

The embodiment of FIG. 2 further differs from the embodiment of FIG. 1 in that the relay coil 56 is connected in parallel with an alarm 78 and serves to actuate a single contact 80 to an open position upon energization thereof. The movable contact 80 is cooperable with a pair of fixed contacts connected in series with the power amplifier 36 and energizing source therefor. With this arrangement, the switch 80 will be opened upon energization of the relay coil 56 to break the energizing circuit for the power amplifier 36 rendering it inoperative. As a result the valve 10 will be locked in its existing position and no further positioning thereof will occur.

In the embodiment disclosed in FIG. 2, failure of one of the filaments will thus effect energization of the relay coil 56 and actuation of the movable contact 80 to break the energizing circuit for the amplifier 36 and thereby lock the valve 10 in its existing position. Simultaneously the alarm 78 will sound informing the operator that the control relay 30 has become inoperative and that the valve 10 is locked in position. In response to this warning the operator may manually actuate the switch 76 to its "manual position" to transfer control to the manual controller 46 or service the control relay 30 immediately with the valve 10 locked in position. When the switch 76 is actuated to the "manual" position by the operator in response to sounding of the alarm 78, the switch 77 is simultaneously actuated to its open position to effect deenergization of the relay coil 56 and closure of switch 80 to thereby restore the energizing circuit for amplifier 36 during manual operation while the control relay 30 is being serviced.

Figure 3:
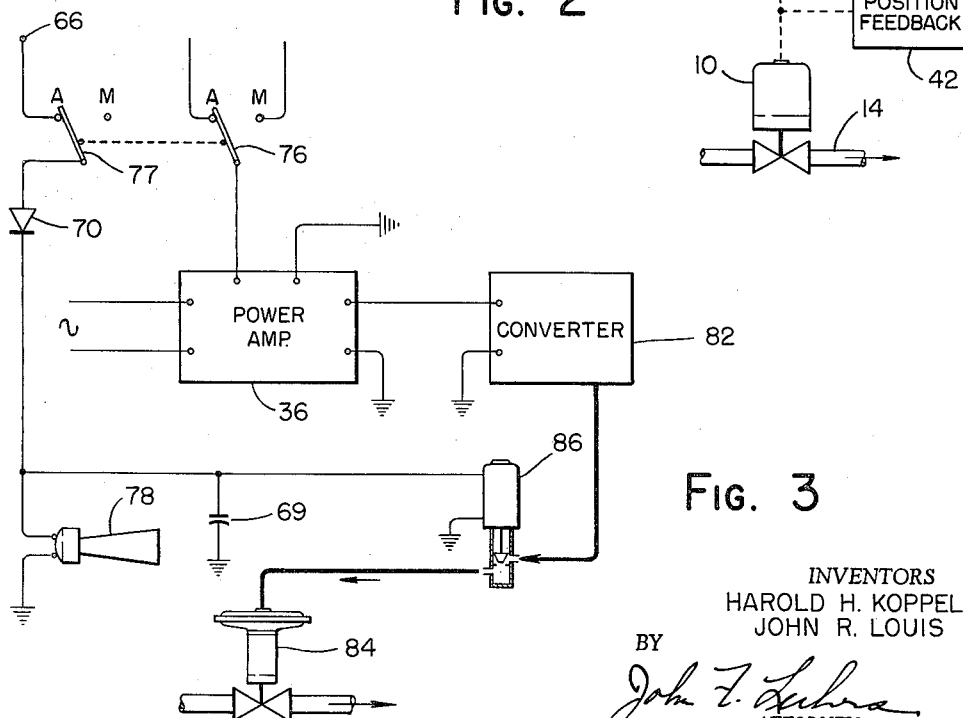
FIG. 3 is a view similar to FIGS. 1 and 2 illustrating a modification of a portion of the apparatus.

FIG. 3 of the drawings illustrate the application of the invention to a pneumatic positioning system. More particularly, the output of the power amplifier 36 is connected to an electrical or pneumatic converter 82 which converts the output of the power amplifier into a variable pneumatic signal for actuating a pneumatic valve 84. As in the case of the embodiment disclosed in FIG. 2 manually actuated switches 76 and 77 are provided for transferring control of the valve 84 from the control relay 30 to the manual controller 46 and for conditioning the system for manual operation.

In the embodiment of FIG. 3 the terminal 66 is connected through the diode rectifier 70 and a solenoid valve 86 to ground. The valve 86 when deenergized serves to apply the pneumatic output signal of the converter 82 to the valve 84 to effect positioning thereof in accordance with the output of control relay 30. In the energized position of this valve, however, communication between the valve 84 and converter 82 is prevented thus blocking the existing signal pressure in the valve 84. Thus, when one of the filaments fails, to produce a potential at terminal 66 the solenoid valve 86 will be energized to block the existing signal pressure applied to the valve 84 and thereby lock the valve 84 in its existing position. As in the case of the embodiment disclosed in FIG. 2 the switch 76 may be actuated by the operator to transfer control to the manual controller 46 while the control relay 30 is being serviced. In this case the switch 77 is effective upon actuation thereof with switch 76 to deenergize the solenoid valve 86 and unblock the valve 84 during manual operation.

Figure 4:
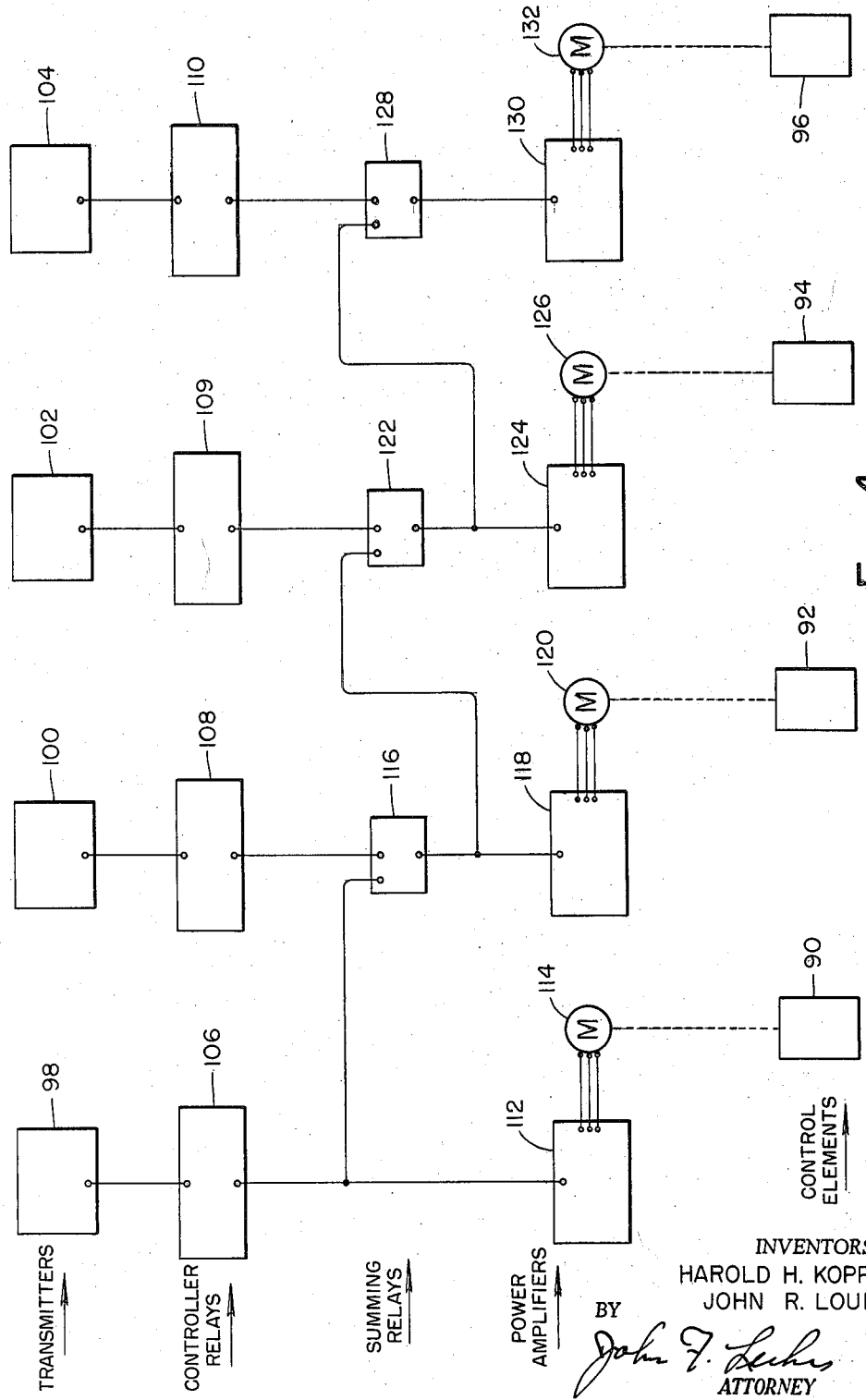
FIG. 4 is a diagrammatic illustration of a multi-element control system.

Referring now to FIG. 4 of the drawings, there is shown a multi-element control system wherein a plurality of control elements 90, 92, 94 and 96 are controlled from a plurality of electric transmitters 98, 100, 102 and 104. The transmitters illustrated may be of the type disclosed in FIG. 1, while the control elements may comprise valves or other devices such as fans, pumps, etc.

Control relays 106, 108, 109 and 110 are responsive to the outputs of transmitters 98, 100, 102 and 104 respectively and are effective to establish electric signals representative of the variable and having desired characteristics. These control relays are generally of the type disclosed in FIGS. 1 and 2 and disclosed and claimed in copending application Serial No. 805,019. The control relays may produce the same control action or different control actions such as proportional, reset, and rate or combinations thereof.

The output of control relay 106 is amplified by a power amplifier 112 of the type disclosed in FIGS. 1, 2 and 3, the output of which is utilized to control electric motor 114 which actuates the control element 90.

In addition, the output of control relay 106 is fed into a summing relay 116 which is responsive to the sum of the output signals of control relays 106 and 108 to establish a proportional output signal. The output signal of summing relay 116 is fed into power amplifier 118 to control an electric motor 120 and positioning of control element 92.

Similarly, the output of summing relay 116 and output of control relay 109 are combined in a summing relay 122, the output of which is supplied to a power amplifier 124. An electric motor 126 is responsive to the output of power amplifier 124 to position control element 94.

To complete the system the outputs of summing relay 122 and control relay 110 are combined in a summing relay 128. An electric motor 132 is responsive to the output of power amplifier 130 to position the control element 96.

In the system illustrated in FIG. 4 the control elements 90, 92, 94 and 96 are thus controlled in parallel from the output of transmitter 98. The control element 92 is further readjusted from the output of transmitter 100 while the control element 94 is readjusted from the outputs of both transmitters 100 and 102. Similarly, the position of control element 96 is further readjusted from the outputs of transmitter 100, 102 and 104. Inasmuch as such parallel methods of control are well known to those skilled in the art further description is deemed unnecessary.

The control relays 106, 108, 109 and 110 and the summing relays 116, 122 and 128 all employ an amplifier circuit of the type disclosed in copending application Serial No. 770,710, now Patent No. 3,080,531. Thus, each of these components utilizes a pair of double triode tubes indicated by the reference numerals 32 and 34 in FIG. 1. Accordingly, each of the summing relays and control relays is subject to failure as a result of filament burnout etc. as hereinbefore described.

In the single element control systems disclosed in FIGS. 1, 2 and 3, provision was made for terminating or transferring control to manual in response to failure of one of the tubes of the amplifier circuit since the position of the control element was directly affected by the output of the single control relay disclosed. In the more complex system of FIG. 4, however, failure of any one or several of the control relays and summing relays will not affect the position of all the control elements and, therefore, it is not desired to terminate or modify control of every control element in response to a failure in any one or several of the control relays or summing relays.

In FIG. 4 it will be noted that the output of controller 106 affects the position of all of the control elements while the outputs of control relay 108 and summing relay 116 each affect only the positions of control elements 92, 94 and 96. Control relay 109 and summing relay 122 each affect only the positions of control elements 94 and 96 while control relay 110 and summing relay 128 affects only the position of control element 96. Thus, upon failure of control relay 106 it is desired to modify or terminate control of all of the control elements while in response to a failure of control relay 108 or summing relay 116 it is desired to only modify or terminate control of the control elements 92, 94 and 96. Similarly, upon failure of control relay 109 or summing relay 122 it is desired to modify or terminate control of control elements 94 and 96, while in the case of failure of controller 110 or summing relay 128 only modification or termination of the control element 96 is desired.

Figure 5:
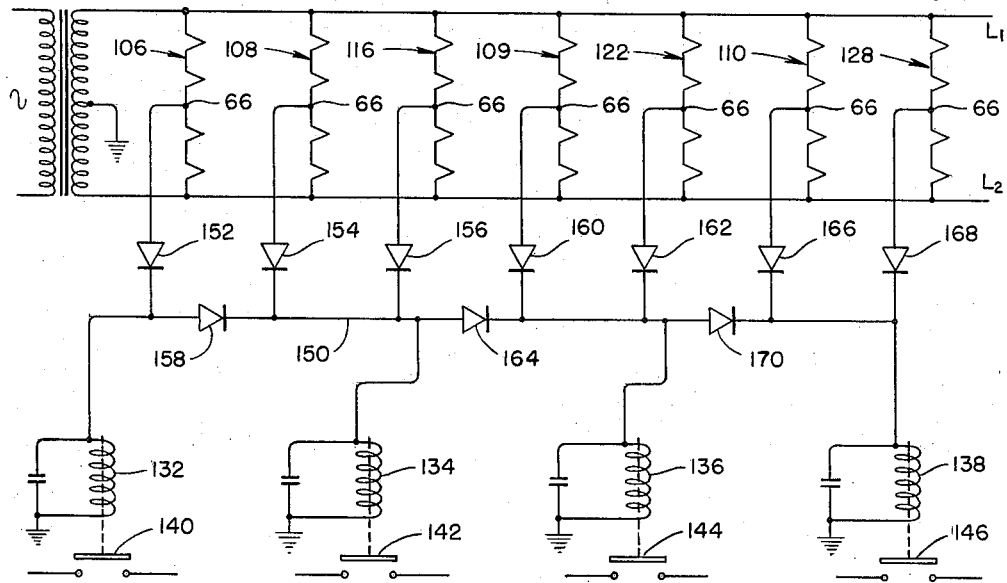
FIG. 5 is a diagrammatic illustration of the application of the invention to the system of FIG. 4.

Referring now to FIG. 5 of the drawings, there is shown energizing circuits for the filaments of the various tubes employed and a logic circuit for providing the desired termination or modification of the control of the control element 90, 92, 94 and 96 in response to failure of any of the controllers or summing relays. The four filaments of each control relay and summing relay are connected in series across conductors $L_1$ and $L_2$. The conductors $L_1$ and $L_2$ are preferably connected to a grounded center tap secondary winding of a transformer similar to transformer 65 illustrated in FIGS. 1 and 2. Each filament circuit is provided with a terminal 66 intermediate the two tubes which as previously described is at zero potential when each filament is functioning properly.

Relay coils 132, 134, 136 and 138 and associated switches 140, 142, 144 and 146 respectively are arranged to be selectively responsive to the existence of potentials at terminals 66 to selectively modify or terminate control of the control elements 90, 92, 94 and 96. The switch associated with each relay coil may be arranged to transfer the control of its associated control element from automatic to manual operation or to lock the control element in position or merely to manifest the failure as described in connection with FIGS. 1, 2 and 3.

A network of diode rectifying elements is provided for establishing a system logic to effect selective energization of the relay coils. Thus, in response to failure of any one of the filaments in control relay 106 the logic circuit is effective to energize all of the relay coils 132, 134, 136 and 138; while in response to failure of any one of the filaments in control relay 108 or summing relay 116 the logic circuit is effective to only energize relay coils 134, 136 and 138. In response to failure of a filament in control relay 109 or summing relay 122, the relay coils 136 and 138 are energized; while in response to failure of control relay 110 or summing relay 128 only the relay coil 138 is energized.

Referring now to the logic circuit, the terminal 66 in the filament circuit of control relay 106 is connected through diode rectifier 152 to energize relay coils 132, 134, 136 and 138 upon failure of any one of the filaments in control relay 106. The terminals 66 of the control relay 108 and relay 116 are connected through diodes 154 and 156 respectively to effect similar energization of that portion of the circuit containing relay coils 134, 136 and 138. A diode 158 is provided to prevent energization of the relay coil 132 by potentials produced at terminals 66 of control relays 106 and 108. For example, when a potential exists at terminal 66 of control relay 108 or terminal 66 of summing relay 116, diode 154 or diode 156 will conduct during alternate half cycles of the A.-C. potential to effect energization of relay coils 134, 136 and 138 while diode 158 due to its reverse polarity arrangement with respect to diodes 154 and 156 prevents the flow of current to relay coil 132. On the other hand, when a potential exists at terminal 66 of control relay 106 both diodes 152 and 158 will conduct during alternate half cycles to effect energization of all of the relay coils.

Terminals 66 of control relay 109 and summing relay 122 are connected through diodes 160 and 162 respectively to effect energization of that portion of the circuit containing relay coils 136 and 138 in response to failure of a filament in control relay 109 or summing relay 122. In this case the system logic is established by diode 164 which prevents energization of relay coils 132 and 134. The diode 164 will conduct, however, in response to potentials at the terminal 66 of the control relays 106, 108 or summing relay 116. Terminals 66 of control relay 110 and summing relay 128 are connected through diodes 166 and 168 respectively to effect energization of relay coil 138 in response to failure of either control relay 110 or summing relay 128. In this case diode 170 is effective to prevent energization of relay coils 132, 134 and 136.

It will be apparent that the logic circuit illustrated in FIG. 5 is capable of selectively terminating or modifying operation of desired control elements. Thus, in response to failure of control relay 106 the circuit permits energization of relay coils 132, 134, 136 and 138. Failure of control relay 108 or summing relay 116 will result in energization of relay coils 134, 136 and 138, the diode 158 preventing energization of relay coil 132. Similarly, failure of either of control relay 109 or summing relay 122 will effect energization of relay coils 136, and 138, the diode 164 preventing energization of the other relay coils. Failure of either of the control relay 110 or summing relay 128 will effect energization of relay coil 138, the diode 170 preventing energization of the other relays. A system logic is thus provided which effects termination or modification of the control of only those control elements directly affected by failure of a particular relay.

Figure 6:
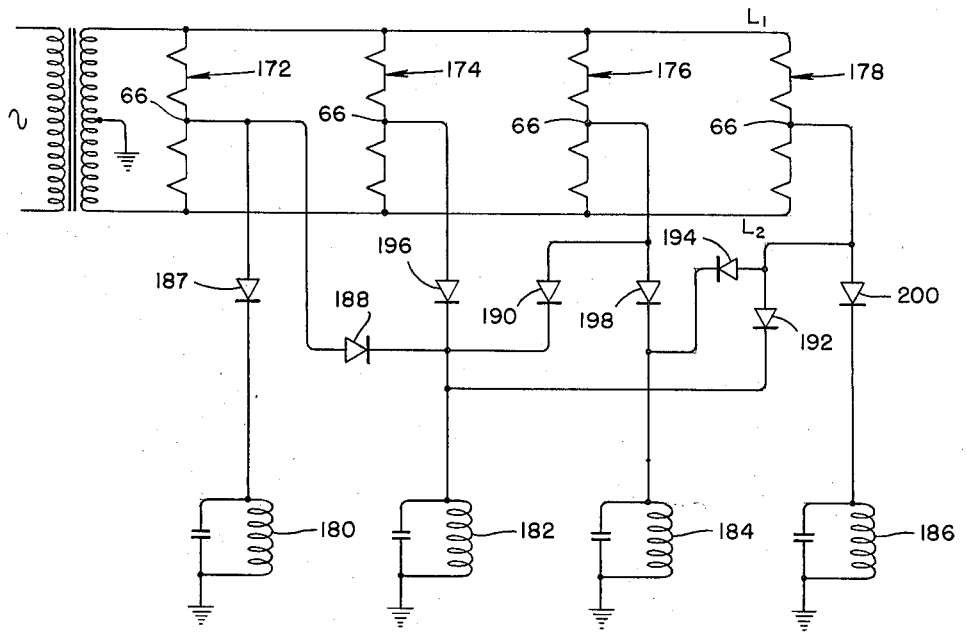
FIG. 6 is a view similar to FIG. 5 illustrating a modification thereof.

Referring now to FIG. 6 of the drawings there is shown a more complicated logic circuit to illustrate the flexibility of the invention and application thereof to even more complex control systems. In this embodiment four filament circuits 172, 174, 176 and 178 are provided each having a terminal 66 at which a potential is produced by a failure of a filament in its associated circuit. Relay coils 180, 182, 184 and 186 are provided to be selectively energized in response to the existence of potentials at the various terminals 66.

For the purposes of illustration assume that it is desired to energize relay coils 180 and 182 in response to a failure in filament circuit 172, relay coil 182 alone in response to a failure in filament circuit 174, relay coils 182 and 184 in response to a failure in circuit 176, and relay coils 182, 184 and 186 in response to a failure in filament circuit 178.

When a potential exists at terminal 66 of filament circuit 172, diodes 187 and 188 will conduct to energize relay coils 180 and 182. Energization of relay coils 184 and 186 will be prevented by diodes 190 and 192.

When a potential exists at terminal 66 of filament circuit 174, the diode 196 will conduct to energize relay coil 182. Energization of the other relay coils will be prevented through the polarity arrangement of diodes 188, 190, and 192. Similarly, upon the existence of a potential at terminal 66 of circuit 176 the diodes 190 and 198 will conduct to energize relay coils 182 and 184 respectively while energization of relay coils 180 and 186 will be prevented by diodes 188, 194 and 192. A potential at terminal 66 of circuit 178 will effect energization of relay coils 182, 184, and 186 through diodes 194, 192 and 200 respectively with diode 188 preventing energization of relay coil 180.

It will now be apparent that by appropriately connecting various combination of diodes any desired logic can be obtained. In a more complex system any desired logic can be obtained by connecting each terminal through a diode rectifier to the particular relay coil or other device to be energized as illustrated in FIG. 6. The diodes function to determine the logic for the system in addition to providing their ordinary function of rectification of the alternating signals for application to a D.-C. relay coil. In addiiton the diodes are effective to prevent feedback from the relay coil energizing circuits to the terminals 66 which are at zero potential to thereby render the system extremely reliable and capable of accurately manifesting a failure of any one of a plurality of components.

It will be apparent to those skilled in the art that the invention is not limited to any of the particular applications herein shown and described but that such applications are for purposes of illustration rather than limitation and that the invention is applicable to many situations where it is desired to selectively produce manifestations of failure of one or more of a plurality of electrical components. It will also be apparent to those skilled in the art that many changes may be made in the construction and arrangement of the parts without departing from the scope of the invention as defined in the appended claims.

What we claim as new and desire to secure by Letters Patent of the United States is:

1. A circuit responsive to the failure of one of a plurality of electric components comprising, means for connecting the components in a series circuit across a source of alternating voltage, a terminal in said series circuit at zero potential when said components are operative, said terminal adapted to undergo a change in potential upon failure of one or more of said components, electrically operative means responsive to the potential of said terminal for manifesting the failure of a component, and rectifying means connecting said terminal with said electrically operative means to apply a direct voltage to said electrically operative means.

2. The combination as claimed in claim 1 wherein said rectifying means comprise a diode rectifier element.

3. A combination as claimed in claim 2 wherein said electrically operative means comprises a direct current relay coil connected in series with said diode rectifier element and said terminal.

4. In a system responsive to electrical component failure, the combination comprising a plurality of electrical devices each having components subject to failure, a circuit associated with each of said components having a terminal adapted to undergo a change in potential in response to a failure of any one of said components, a plurality of electrically operative manifesting means adapted to be energized by changes in potentials at said terminals, a logic circuit for effecting energization of desired different combinations of said manifesting means in response to failure of components in different devices, and rectifying means connecting each of said terminals to said logic circuit to apply a direct current voltage to said logic circuit and said manifesting means.

5. In a system responsive to filament failure of vacuum tubes, the combination comprising, a plurality of electrical devices each having a plurality of vacuum tubes, an electrical circuit for each of said devices connecting the filaments of said tubes in series across a source of alternating voltage, a terminal in each of said circuits having a zero potential when said filaments are operative but a different potential upon failure of one of said filaments, a plurality of electrically operative means responsive to the potentials of said terminals for manifesting the failure of said filaments, a logic circuit including a plurality of diode rectifier elements to effect energization of different ones of said electrically operative means or combinations thereof in response to filament failure in different devices, and rectifying means connecting each of said terminals to said logic circuit to apply a direct current voltage to said logic circuit and said electrically operative means.

6. A system as claimed in claim 5 wherein said electrical devices comprise electrical amplifier circuits each having four triode amplifier sections.

7. A system as claimed in claim 6 wherein each of said manifesting means comprise direct current relay coils and switch means arranged to be actuated by said relay coils respectively.

8. A circuit responsive to filament failure of a plurality of vacuum tubes comprising, means for connecting the filaments of the tubes in a series circuit across a source of alternating voltage, a terminal in said series circuit having a zero potential when said filaments are operative but a different potential upon failure of any one of said filaments, a relay coil adapted to be energized by a change in potential at said terminal, and a diode rectifier element connecting said terminal with said relay coil.

9. In an electric control system the combination comprising, a plurality of transmitting devices for establishing signals representative of a plurality of variables, a plurality of control elements responsive to said signals, a plurality of electrical relays for amplifying said signals and introducing characteristics into said signals, said relays each including an amplifier circuit having a plurality of vacuum tubes, a circuit associated with each of said amplifier circuits for connecting the filaments of its tubes in series across a source of alternating voltage, a terminal in each of said circuits adapted to undergo a change in electrical potential in response to failure of any one of said filaments in the circuit, electrically operative means associated with each of said control elements for manifesting failure of the relays affecting the position of said control elements, a logic circuit to effect energization of only those electrically operative means associated with control elements affected by a failure, and rectifying means connecting each of said terminals to said logic circuit to apply a direct current voltage to said logic circuit and said electrically operative means.

10. In an electric control system, the combination comprising, a transmitting device for establishing an electrical signal representative of a variable, a control element responsive to said signal, an electric relay for amplifying said signal and introducing characteristics into said signal, said relay including an amplifier circuit having a plurality of vacuum tubes, an electrical circuit associated with said amplifier circuit for connecting the filaments of said tubes in series across a source of alternating voltage, a terminal in said circuit adapted to undergo a change in electrical potential in response to failure of any one of said filaments in said circuit, manually operative means for controlling said control element independently of said relay, switch means having one position for connecting said relay to said control element and a second position for connecting said manually operative means to said control element, and means associated with said switch means for actuating the same from said first position to said second position in response to a predetermined change in the potential of said terminal.

11. In an electric control system, the combination comprising, a transmitting device for establishing an electrical signal representative of a variable, a control element responsive to said signal, an electric control relay for amplifying said signal and introducing characteristics into said signal, said relay including an amplifier circuit having a plurality of vacuum tubes, a circuit associated with said amplifier circuit for connecting the filaments of said tubes in series across a source of alternating voltage, a terminal in said filament circuit adapted to undergo a change in electrical potential in response to failure of any one of said filaments, a direct current voltage relay coil, a diode rectifier element connecting said relay coil in series with said terminal, and switch means actuated by said relay coil.

12. In an electric control system, the combination comprising, a transmitting device for establishing an electrical signal representative of the magnitude of a variable, a control element responsive to said signal, an electrical relay for amplifying said signal and introducing characteristics into said signal, said relay including an amplifier circuit having a plurality of vacuum tubes, a power amplifier energized by a source of voltage for amplifying the output of said relay, a circuit associated with said amplifier circuit connecting the filaments of said tubes in series, a terminal in said circuit adapted to undergo a change in electrical potential in response to failure of any one of said filaments in said circuit, switch means for connecting said power amplifier to said voltage source, and means responsive to a change in potential at said terminal for actuating said switch means to disconnect said power amplifier from said voltage source.

13. In an electric control system, the combination comprising, a transmitting device for establishing an electric signal representative of a variable, a control element responsive to said signal, an electrical relay for amplifying said signal and introducing characteristics into said signal, said relay including an amplifier circuit having a plurality of vacuum tubes, a circuit associated with said amplifier circuit for connecting the filaments of said tubes in series across a source of alternating voltage, a terminal in said circuit adapted to undergo a change in electrical potential in response to failure of any one of said filaments in said circuits, and means responsive to a change in potential at said terminal for terminating control of said control element from said electrical relay.

14. In an electrical control system, the combination comprising, a transmitting device for establishing an electric signal representative of a variable, a control element responsive to said signal, an electrical relay for amplifying said signal and introducing characteristics into said signal, said relay including an amplifier circuit having a plurality of vacuum tubes, a positioning system for said control element, a circuit connecting the filaments of said tubes in series across a source of alternating voltage, a terminal in said circuit adapted to undergo a change in potential in response to a failure of one of said filaments, manually operative means for positioning said control element independently of said relay, switch means having one position for connecting said electrical relay to said positioning system and a second position for connecting said manually operative means to said positioning system, means responsive to a change in potential at said terminal in said first position of said switch means for rendering said positioning system inoperative, and means associated with said switch means for rendering said last named means ineffective in said second position of said switch means.

References Cited in the file of this patent

UNITED STATES PATENTS

| | | |
|---|---|---|
| 1,733,045 | Baker | Oct. 22, 1929 |
| 2,428,723 | Reeves | Oct. 7, 1947 |
| 2,712,130 | Sprague | June 28, 1955 |
| 2,730,697 | Wermelskirchen | Jan. 10, 1956 |
| 2,931,950 | Minder | Apr. 5, 1960 |

OTHER REFERENCES

Publication: "Electronic Design," Nov. 15, 1956, article entitled "Rectifiers and Circuits for D.C. Relays," by F. W. Parrish, page 22.